United States Patent [19]

Wieland

[11] Patent Number: 4,678,411
[45] Date of Patent: Jul. 7, 1987

[54] OIL PUMP

[75] Inventor: Dieter Wieland, Remseck, Fed. Rep. of Germany

[73] Assignee: Andreas Stihl, Waiblingen, Fed. Rep. of Germany

[21] Appl. No.: 811,180

[22] Filed: Dec. 20, 1985

[30] Foreign Application Priority Data

Dec. 22, 1984 [DE] Fed. Rep. of Germany ....... 3447091

[51] Int. Cl.$^4$ .................. F04B 7/06; F16N 13/20; F15B 16/24; F16C 1/10
[52] U.S. Cl. .................................. 417/500; 92/13.7; 74/22 R; 74/838; 74/501 R
[58] Field of Search ............... 417/212, 214, 492, 500; 92/13.7; 184/33; 74/56, 501 A, 501 R, 502, 22 R, 838

[56] References Cited

U.S. PATENT DOCUMENTS

| | | | |
|---|---|---|---|
| 2,056,434 | 10/1936 | Multer | 184/33 |
| 4,000,790 | 1/1977 | Seufer | 184/33 |
| 4,023,435 | 5/1977 | LaDue | 74/501 |
| 4,034,830 | 7/1977 | Mukai | 184/33 |
| 4,486,155 | 12/1984 | Roca-Nierga | 417/500 |

FOREIGN PATENT DOCUMENTS 1450766 9/1976 United Kingdom ................ 92/13.7

Primary Examiner—Leonard E. Smith
Assistant Examiner—Jane E. Obee
Attorney, Agent, or Firm—Walter Ottesen

[57] ABSTRACT

An oil pump is disclosed for a motor-driven apparatus and in particular for lubricating the cutting chain of a chain saw. The oil pump has a pump piston that is rotatable about its longitudinal axis and has a control cam for its axial reciprocation, which as it revolves comes into contact engagement with a control bolt. A control slide upon which a biasing force is exerted is associated with the pump piston. The stroke of the pump piston is limited during normal operation by means of the control slide. If an increased amount of lubricating oil is required, the limitation on the piston stroke effected by the control slide is overcome by moving the control slide away from the pump piston counter to its biasing force, so that the pump piston can move through its maximum total stroke as predetermined by the control cam.

15 Claims, 1 Drawing Figure

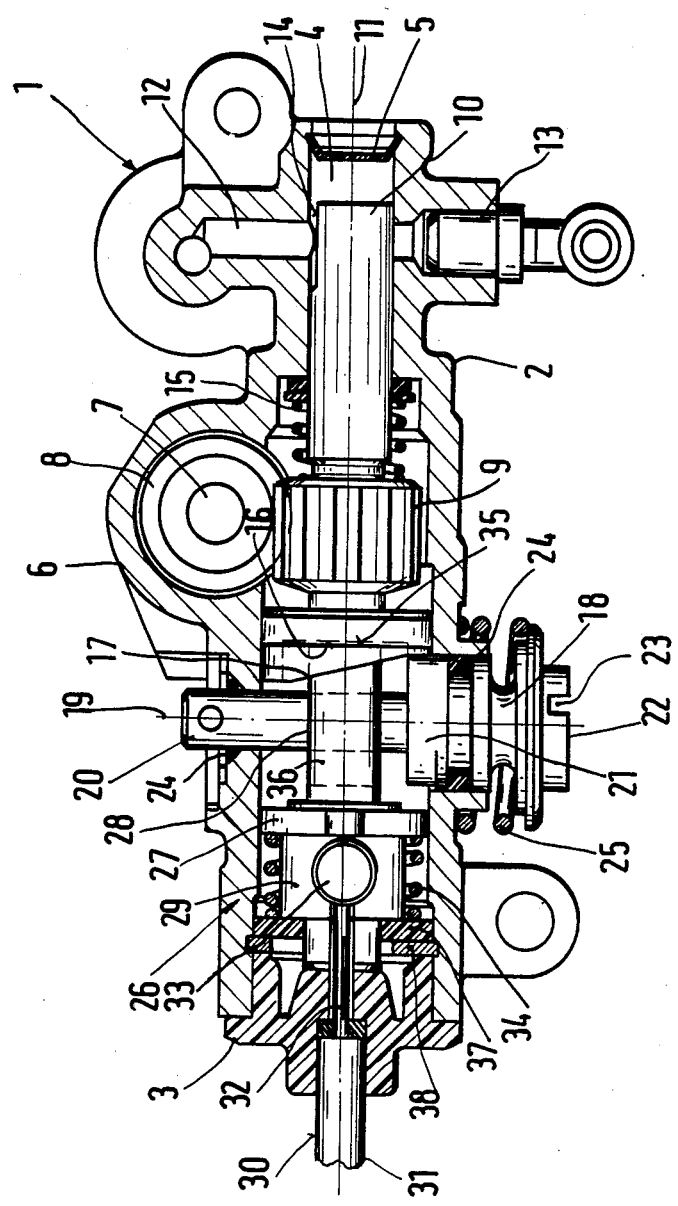

4,678,411

OIL PUMP

FIELD OF THE INVENTION

The invention relates to an oil pump for a motor-driven tool such as a pump for lubricating the cutting chain of a chain saw.

BACKGROUND OF THE INVENTION

In relatively large chain saws, it is known to provide two oil pumps for lubricating the chain. One of the pumps is preferably positively driven by the motor. The second oil pump is provided in the event that a relatively large lubricating oil requirement should arise and is manually actuated by repeatedly moving an actuating lever back and forth to initiate pumping. This kind of redundancy in the oil supply apparatus is expensive. Operating the additional oil pump is also inconvenient, because of the need to move the actuating lever back and forth continuously while increased lubricating oil is required, and this affects the use of the chain saw.

SUMMARY OF THE INVENTION

It is an object of the invention to provide an oil pump for a motor-driven apparatus, such that a second oil pump can be dispensed with and yet an increased amount of lubricating oil, beyond that needed for normal operation, can be attained by simple means and using a simple actuating movement.

Preferred embodiments and improvements of the invention, as well as further advantages and essential details thereof, will become apparent from the ensuing description and the drawing as well as from the claims.

BRIEF DESCRIPTION OF THE DRAWING

The invention will now be described with reference to the drawing, which shows an elevation view, partially in section, of an oil pump according to the invention.

DESCRIPTION OF THE PREFERRED EMBODIMENTS OF THE INVENTION

The oil pump 1 according to the invention is provided for a motor-driven apparatus, in particular a chain saw, the chain of which is lubricated during operation with oil pumped by means of the oil pump 1.

The oil pump 1 has a pump housing 2 which on the lefthand side as seen in the drawing is closed off by a closure cap 3 and on the righthand side has a sealing cap 5. The oil pump 1 has a worm drive 6, comprising a drive shaft 7 and a drive screw 8 which drives a pinion 9. The pinion 9 is formed directly on a pump piston 10, which thus rotates, together with the driven pinion 9, about the longitudinal axis 11.

In the righthand portion of the pump housing 2 as seen in the drawing, an inlet 12 leading into the pump cylinder 4 is provided for the lubricating oil at the top, and an outlet 13 for the lubricating oil is provided at the bottom, leading out of the pump cylinder 4. The circular-cylindrical pump piston 10 has a flattened area 14 on its circumference, at the front in the vicinity of the inlet 12 and outlet 13. It is also possible to provide the inlet 12 and the outlet 13 at exactly opposite locations on the pump housing 2, in other words exchanging one for the other, so that the inlet is located at the bottom and the outlet at the top.

The pump piston 10 extends through a biasing spring 15 in the form of a helical compression spring, which is supported at one end on a wall in the pump housing 2 and at the other end on a lateral face of the pinion 9. Thus the biasing spring 15 presses toward the left, as seen in the drawing, against the pinion 9 and thereby effects the intake stroke of the pump piston 10.

On the lefthand side of the pinion 9 remote from the biasing spring 15, the pump piston 10 has a rear face 16 on its end, which is defined by a substantially annular control cam 17 about its periphery, the cam 17 belonging to the pump piston 10. The slope of the control cam 17 on its face end is preferably such, in the present embodiment, that the maximum total stroke of the pump piston 10 of the oil pump 1, which is shown here about twice actual size, is approximately 2.5 mm.

A control bolt 18 is associated with the control cam 17 and is supported in the pump housing 2 transversely to the longitudinal axis 11 and is rotatable about a transverse axis 19. The control bolt 18 has an axial shank 20, the free end portion of which is supported in the upper portion of the wall of the pump housing 2. The control bolt 18 further has both an eccentric portion 21 and a head 22, in which a slit 23 is formed for engagement by a screwdriver or the like. Sealing rings 24 are disposed in the free end area of the axial shank 20 and on the opposite head area of the control bolt 18. A spring element 25 is associated with the control bolt 18 and is supported on both the head 22 and outside on the wall of the pump housing 2. The spring element 25 is embodied as a helical compression spring and prevents the control bolt 18 from shifting unintentionally, instead assuring that the control bolt remains in its established position.

It should also be noted that the oil pump 1 has a control slide 26, which is located in the lefthand portion of the pump housing 2 as seen in the drawing. The control slide 26 has a collar 27, an extension part 28 extending toward the right from the collar 27 toward the pump piston 10, and an extension 29 extending to the left from the collar 27.

A Bowden cable 30 extending axially to the left is associated with the control slide 26, which is supported in the pump housing 2 coaxially with the pump piston 10. The Bowden cable 30 has an outer guide tube 31, the end portion of which is supported and braced in a stepped recess in the closure cap 3. A wire pull 32 is located in the guide tube 31 and is attached to a head portion 33 in a releasable manner in a transverse bore of the extension 29 of the control slide 26. The other end of the wire pull 32 is disposed on an actuating lever, not shown here, with which the control slide 26 can be displaced, in the event of an increased lubricating oil requirement, toward the left into the position shown in the drawing and even somewhat beyond that, counter to the force of a spring 34. The spring 34 is configured as a helical compression spring, the force of which is notably greater than the force of the biasing spring 15 of the pump piston 10 which acts in the opposite direction; thus during normal operation the collar 27 rests on the eccentric portion 21, and the end face 35 of the extension part 28, resting on the rear face 16 of the pump piston 10, limits the leftward stroke (intake stroke) of the pump piston in such a way that only a portion of the end-face slope of the control cam 17, namely the portion that protrudes the most, comes to rest on the eccentric portion 21 on the side thereof opposite the collar 27. Thus the effect of the control slide 26 is that during normal operation, the pump piston 10 executes only a portion of the total possible stroke.

By adjusting the eccentric portion 21, only a relatively small change in the piston stroke can be made. For the position of the eccentric portion 21 shown, the piston stroke amounts to approximately 0.7 mm. In the maximal position of the eccentric portion 21, rotated about the transverse axis 19, the piston stroke amounts to approximately 1.6 mm. Thus the stroke of the pump piston 10 can be varied by about 0.9 mm by adjusting the eccentric portion 21, which makes it possible to adapt the oil supply quite well to actual requirements during operation.

It should also be noted that the extension part 28 itself is substantially fork-like and has a longitudinal recess 36, in which the axial shank 20 of the control bolt 18 extends crosswise through the extension part 28 and which enables an unhindered axial displacement of the extension part 28 that belongs to the control slide 26.

In the event of an increased lubricating oil requirement, the stroke of the pump piston 10 is increased over that for normal operation simply by using the actuating lever to pull the control slide 26 into the position shown, in the course of which the collar 27 moves away from the eccentric portion 21. At the same time, the end face 35 of the extension part 28 shifts toward the left into the position shown, so that the biasing spring 15 can likewise press the pump piston 10, during its intake stroke, farther to the left into the illustrated position. Now as the pump piston 10 rotates, the entire endface slope of the control cam 17 is available for the piston stroke. Accordingly, with the control slide 26 pulled back, the control cam 17 is always in physical contact with the eccentric portion 21 in every rotational position of the pump piston 10. The total stroke of the pump piston 10, which is predetermined by the control cam 17, amounts in this case to approximately 2.5 mm, so that as compared with the maximum established position during normal operation, a further increase of the piston stroke by approximately 0.9 mm is provided for the purpose of meeting an increased lubricating oil requirement. Upon the release of the actuating lever, the spring 34 presses the control slide 26 back toward the right, until the collar 27 strikes against the eccentric portion 21, so that the face end 35 of the extension part 28 likewise shifts the pump piston 10, on its rear face 16, somewhat to the right in order to restrict the piston stroke; as a result, the normal operation position is immediately restored.

The spring 34 is supported, on the side opposite the collar 27, on a disk 37, which in turn rests on a snap ring 38 that is fixed within a circumferential groove of the pump housing 2.

It is understood that the foregoing description is that of the preferred embodiments of the invention and that various changes and modifications may be made thereto without departing from the spirit and scope of the invention as defined in the appended claims.

What is claimed is:

1. An oil pump for a motor-driven tool such as for supplying lubricating oil to the cutting chain of a chain saw, the oil pump comprising:

a housing defining a longitudinal housing axis;

a piston defining a longitudinal piston axis coincident with said longitudinal housing axis and being mounted in said housing so as to be displaceable along and rotatable about said axis;

drive means for rotatably driving said piston about said axis;

control cam means for reciprocably displacing said piston through a predetermined stroke along said axis as said piston is rotated about said axis;

a control slider slideably mounted in said housing for movement between a first position whereat said control slider limits the movement of said piston to a portion of said stroke thereby causing said piston to pump the lubricating oil at a first rate and a second position whereat said piston is free to move through the full excursion of said stroke thereby causing said piston to pump the lubricating oil at a second rate greater than said first rate;

actuator means for actuating said control slider for moving the same against the force of said slider spring from said first position to said second position, said actuator means including a manually actuated Bowden cable connected to said control slider;

said control slider having a projection extending outwardly therefrom in a direction away from said piston and along said housing axis, said housing being an elongated structure having a cover disposed at one end thereof adjacent said projection, said Bowden cable including a pull wire anchored in said projection and a casing surrounding said pull wire, said casing being supported on said cover.

2. An oil pump for a motor-driven tool such as for supplying lubricating oil to the cutting chain of a chain saw, the oil pump comprising:

an elongated housing defining a longitudinal housing axis;

a piston defining a longitudinal piston axis coincident with said housing axis and being mounted in said housing so as to be displaceable along and rotatable about said axis;

drive means for rotatably driving said piston about said axis;

control cam means for reciprocably displacing said piston through a predetermined stroke along said axis as said piston is rotated about said axis;

a control slider slideably mounted in said housing for movement along said housing axis between a first position whereat said control slider limits the movement of said piston to a portion of said stroke thereby causing said piston to pump the lubricating oil at a first rate and a second position whereat said piston is free to move through the full excursion of said stroke thereby causing said piston to pump the lubricating oil at a second rate greater than said first rate;

control slider resilient biasing means for biasing said control slider into said first position;

said control cam means including cam follower means mounted in said housing; and, a cam surface for rotation with said piston about said axis;

piston resilient biasing means for biasing said piston with said cam surface against said cam follower means thereby causing said piston to reciprocate along said axis as said piston rotates about said axis;

said piston having a rearward surface facing toward said control slider, said control slider having an end face and being mounted in said housing coaxially with said piston so as to cause said end face to be in contact engagement with said rearward surface while in said first position and to prevent said cam surface from engaging said cam follower means during a portion of each revolution of said piston about said piston axis thereby limiting said movement of said piston;

said control slider resilient biasing means being dimensioned to provide a biasing force greater than the biasing force developed by said piston resilient biasing means when said control slider is in said first position to hold the latter in said first position thereby restricting the movement of said piston to said portion of said stroke; and, actuating means for rapidly displacing said slider along said housing axis, said actuating means including a manually-actuated cable connected to said slider for displacing the latter into said second position against the force of said control slider resilient biasing means thereby permitting said piston to pump the lubricating oil at said second rate.

3. The oil pump of claim 1, said cam surface being an annular cam surface for rotation with said piston about said axis.

4. The oil pump of claim 1, said manually-actuated cable being a Bowden cable connected to said control slider.

5. The oil pump of claim 1, said piston resilient biasing means being a piston spring resiliently biasing said piston along said axis toward said control slider.

6. The oil pump of claim 5, said drive means including a worm gear rotatably mounted in said housing and a pinion formed on said piston and in mesh with said worm gear; said pinion defining a shoulder facing away from said control slider, said piston spring being a spiral spring surrounding said piston and being interposed between said shoulder and said housing.

7. The oil pump of claim 6, said cam surface being formed on said piston in surrounding relationship to said rearward surface; said pinion being disposed between said cam surface and said piston spring; and, said rearward surface being adapted to receive said end face of said control slider in contact engagement therewith.

8. The oil pump of claim 7, said cam follower means being a bolt-like member defining a longitudinally extending bolt axis, the bolt-like member being mounted in said housing so as to cause said bolt axis to extend transversely to said piston axis; said cam follower being formed on said bolt-like member; said control slider having a main body and a bifurcated extension defining an elongated pass-through opening for accommodating said bolt-like member, said bifurcated extension extending outwardly along said piston axis toward said piston; and, said end face of said control slider being formed at the outermost end of said bifurcated extension.

9. The oil pump of claim 8, said bolt-like member being rotatably mounted in said housing for rotation about said bolt axis, said cam follower being an eccentric disposed adjacent said extension for adjusting the stroke of said piston in dependence upon the rotational position of said bolt-like member when said control slider is in said first position; said first position of said control slider being selected so as to limit the movement of said piston through only said portion of said stroke by causing said cam surface to be in contact engagement with said eccentric for only a portion of each revolution thereof.

10. The oil pump of claim 9, said control cam means including a spring for spring-loading said bolt-like member in said housing to prevent the same from becoming inadvertently displaced from a preset position.

11. The oil pump of claim 9, said second position of said control slider being spaced from said first position thereof a distance selected to ensure that said end face of said extension is disengaged from said rearward surface thereby permitting said cam surface to be in full cam engagement with said eccentric over the entire extent of said surface thereby causing said piston to pump the lubricating oil at said second rate.

12. An oil pump for a motor-driven tool such as for supplying lubricating oil to the cutting chain of a chain saw, the oil pump comprising:

a housing;

a piston defining a longitudinal piston axis and being mounted in said housing so as to be displaceable along and rotatable about said axis;

drive means for rotatably driving said piston about said axis;

control cam means for reciprocably displacing said piston through a predetermined stroke along said axis as said piston is rotated about said axis;

a control slider slideably mounted in said housing for movement between a first position whereat said control slider limits the movement of said piston to a portion of said stroke thereby causing said piston to pump the lubricating oil at a first rate and a second position whereat said piston is free to move through the full excursion of said stroke thereby causing said piston to pump the lubricating oil at a second rate greater than said first rate;

control slider resilient biasing means for biasing said control slider into said first position; and actuating means for actuating said slider to displace the same into said second position;

said control cam means including cam follower means mounted in said housing; and, an annular cam surface for rotation with said piston about said axis;

piston resilient biasing means for biasing said piston with said cam surface against said cam follower means thereby causing said piston to reciprocate along said axis as said piston rotates about said axis;

said piston resilient biasing means being a piston spring resiliently biasing said piston along said axis toward said control slider;

said piston having a rearward surface facing toward said control slider, said control slider having an end face and being mounted in said housing coaxially with said piston so as to cause said end face to be in contact engagement with said rearward surface while in said first position;

said drive means including a worm gear rotatably mounted in said housing and a pinion formed on said piston and in mesh with said worm gear; said pinion defining a shoulder facing away from said control slider, said piston spring being a spiral spring surrounding said piston and being interposed between said shoulder and said housing;

said cam surface being formed on said piston in surrounding relationship to said rearward surface; said pinion being disposed between said cam surface and said piston spring; and, said rearward surface being adapted to receive said end face of said control slider in contact engagement therewith;

said cam follower means being a bolt-like member defining a longitudinally extending bolt axis, the bolt-like member being mounted in said housing so as to cause said bolt axis to extend transversely to said piston axis; said cam follower being formed on said bolt-like member; said control slider having a main body and a bifurcated extension defining an elongated pass-through opening for accommodating said bolt-like member, said bifurcated extension extending outwardly along said piston axis toward said piston; and, said end face of said control slider being formed at the outermost end of said bifurcated extension;

said bolt-like member being rotatably mounted in said housing for rotation about said bolt axis, said cam follower being an eccentric disposed adjacent said extension for adjusting the stroke of said piston in dependence upon the rotational position of said bolt-like member when said control slider is in said first position; said first position of said control slider being selected so as to limit the movement of said piston through only said portion of said stroke by causing said cam surface to be in contact engagement with said eccentric for only a portion of each revolution thereof; and, said control slider having an abutment collar formed thereon and extending in a direction transversely to said piston axis, said bolt-like member being mounted in said housing so as to cause said eccentric thereof to be disposed between said cam surface and said collar, said control slider resilient biasing means being disposed between said housing and said control slider for resiliently biasing said control slider against said eccentric via said collar thereby defining said first position of said control slider.

13. The oil pump of claim 12, said bifurcated extension being dimensioned so that said end face thereof contact engages said rearward surface so as to cause only a portion of said cam surface to engage said eccentric during the rotation of said piston about said piston axis while said control slider is in said first position.

14. The oil pump of claim 12, said slider resilient biasing means being a slider spring biasing said control slider in a direction opposite to the force of said piston spring, said slider spring developing a force greater than the force developed by said piston spring.

15. The oil pump of claim 14, said collar of said control slider having a first side in contact engagement with said eccentric and a second side facing away from said eccentric, said slider spring being a spiral compression spring having two ends, one of said ends of said slider spring being in abutting engagement with said second side of said collar and the other one of said ends of said slider spring being in abutting engagement with said housing.

* * * * *